(12) United States Patent
Yang et al.

(10) Patent No.: US 6,260,488 B1
(45) Date of Patent: Jul. 17, 2001

(54) MODULAR SHELVING

(75) Inventors: Frank Yang, Palos Verdes Peninsula; John Duval, Long Beach; Darren Saravis, Long Beach; Mike Wick, Long Beach, all of CA (US)

(73) Assignee: Seville Classics, Inc., Los Angeles, CA (US)

( * ) Notice: Subject to any disclaimer, the term of this patent is extended or adjusted under 35 U.S.C. 154(b) by 0 days.

(21) Appl. No.: 09/348,220

(22) Filed: Jul. 6, 1999

(51) Int. Cl.[7] ................................................ A47B 9/00
(52) U.S. Cl. .................... 108/107; 108/180; 108/158.11; 211/182; 211/188
(58) Field of Search ................................ 108/106, 107, 108/110, 180, 181, 144.11, 147.11, 147.12, 147.13, 158.11, 158.12; 211/182, 188, 194; 403/349, 348; 285/402, 361, 396

(56) References Cited

U.S. PATENT DOCUMENTS

| | | | |
|---|---|---|---|
| 3,186,560 | * | 6/1965 | Cristino ................................ 211/194 |
| 3,254,774 | * | 6/1966 | Schild .................................. 211/182 |
| 3,338,605 | * | 8/1967 | Stoeber ................................ 403/174 |
| 3,424,111 | | 1/1969 | Maslow . |
| 3,523,508 | | 8/1970 | Maslow . |
| 3,604,369 | | 9/1971 | Maslow . |
| 3,757,705 | | 9/1973 | Maslow . |
| 3,851,601 | * | 12/1974 | Davis ................................ 108/192 X |
| 3,874,511 | | 4/1975 | Maslow . |
| 4,318,352 | | 3/1982 | Friedman et al. . |
| 4,627,543 | * | 12/1986 | Nicely .......................... 108/147.13 X |
| 4,852,501 | * | 8/1989 | Olson et al. .......................... 108/107 |
| 5,186,197 | * | 2/1993 | Lavine .............................. 403/349 X |
| 5,297,906 | * | 3/1994 | Durand ............................. 403/349 X |
| 5,456,095 | * | 10/1995 | Tawil et al. ...................... 403/349 X |
| 5,466,020 | * | 11/1995 | Page et al. ............................ 285/361 |
| 5,517,928 | * | 5/1996 | Erdman ............................... 108/180 |
| 5,676,263 | | 10/1997 | Chang . |
| 5,904,420 | * | 5/1999 | Dedoes ............................ 403/349 X |

FOREIGN PATENT DOCUMENTS

2164545 * 3/1986 (GB) ..................................... 108/59

* cited by examiner

Primary Examiner—Peter M. Cuomo
Assistant Examiner—Hanh V. Tran
(74) Attorney, Agent, or Firm—Raymond Sun

(57) ABSTRACT

A modular shelving assembly has at least three spaced poles, each having a connector, a first post unit and a second post unit. Each post unit has first and second opposing ends, with a first protrusion extending radially inwardly from the hollow interior surface of the first post unit adjacent the first end thereof, and a second protrusion extending radially inwardly from the hollow interior surface of the second post unit adjacent the second end thereof. Each connector has first and second opposing ends, a first track provided adjacent the first end of the connector and a second track provided adjacent the second end of the connector. Each of the first and second tracks has a leg portion extending from one of the first or second end of the connector, and a foot extending from the leg portion. The first protrusion of each first post unit is retained in the foot of the first track of each connector, and the second protrusion of each second post unit is retained in the foot of the second track of each connector, when the first and second post units are connected to a connector.

12 Claims, 5 Drawing Sheets

MODULAR SHELVING

BACKGROUND OF THE INVENTION

1. Field of the Invention

The present invention relates to modular shelving, and in particular, to an improved connection for use in a modular shelving assembly.

2. Description of the Prior Art

Adjustable metal shelving (also known as "knock-down" shelving) is very popular because they purportedly provide the user with the flexibility to assemble or build shelving units to the desired configurations and needs. In particular, these adjustable shelving units allow the user to adjust the height or distance between the shelves to facilitate storage of items having different shapes and sizes.

FIGS. 1 and 2 illustrate a conventional adjustable shelving assembly. The assembly 1 has four spaced-apart posts 11, a plurality of trays 12 hanging among the four posts 11, and a plurality of sets of four tubular sleeves 13. The post 11 is an integrally formed elongated rod that is provided with a plurality of equally spaced annular peripheral grooves 111. Each tubular sleeve 13 consists of two curved pieces 131 which are engaged fittingly to form an axial through hole 132 having a configuration which conforms to the shape of the post 11. The tubular sleeve 13 has a radial inward protrusion 133 extending from inside its axial through hole 132 and which is adapted to extend into one of the annular grooves 111 on the post 11. The thickness of each tubular sleeve 13 gradually increases from top to bottom, thereby forming a diverging outer wall 134 which has a narrow top end 135 and a wide bottom end 136. The tray 12 includes a tray body 121 which has four positioning tubes 14 provided at the four corners of the tray body 121. Each positioning tube 14 has an inner diameter that is larger than the narrow top end 135 but smaller than the wide bottom end 136 of the tubular sleeves 13.

To assemble the assembly 1, a set of four tubular sleeves 13 are respectively sleeved onto the four posts 11 at an equal height. In other words, four annular grooves 111 (one from each post 11) are chosen at the same height along the respective posts. The protrusions 133 of the tubular sleeves 13 extend into the selected annular grooves 111 of equal height. The four positioning tubes 14 are then sleeved into the four posts 11, respectively, so that each positioning tube 14 slides over its corresponding tubular sleeve 13. Since the inner diameter of the positioning tubes 14 is smaller than the outer diameter of the wide bottom end 136 of the tubular sleeves 13, the positioning tubes 14 frictionally engage, and are restricted by, the wide bottom ends 136. Therefore, the positioning tubes 14 for one tray 12 are tightly fitted and stably positioned on the tubular sleeves 13, which are in turn stably positioned on the respective poles 11 by the protrusions 133 extending into the corresponding annular grooves 111. Other trays 12 can be fixed to the four poles 11 (at another height) in the same manner. To adjust the height of a tray 12, the tray 12 is moved upwardly to disengage the positioning tubes 14 from the tubular sleeves 13, and the tubular sleeves 13 positioned at another height along the posts 11 before the tray 12 is again fixed to the four tubular sleeves 13.

Although it is convenient to adjust the height of the trays 12, the use of the integrally formed posts 11 presents a storage and packing problem in that the height of the posts 11 are much longer than the trays 12, so that the posts 11 and the trays 12 must be packaged separately. Attempts have been made to provide the poles 11 in a plurality of shorter pieces that can be secured together to form a pole 11 of a desired height. One example is illustrated in U.S. Pat. No. 5,676,263 (Chang), which provides threaded connectors for threadably coupling the ends of two different post units. However, the pole structure in U.S. Pat. No. 5,676,263 (Chang) suffers from the drawback that the stability of the assembly may be compromised if the connector is not completely or properly threaded to the ends of the pole units.

To maintain their popularity and utility, adjustable shelving assemblies should accomplish two important objectives: to provide convenience in use, and to provide stability. Given the drawbacks associated with the conventional adjustable shelving units and the known prior art, there still remains a need for pole structures that can provide sufficient stability to a resulting adjustable shelving assembly, while providing the user with convenience when assembling the adjustable shelving assembly.

SUMMARY OF THE DISCLOSURE

In order to accomplish the objects of the present invention, there is provided a modular shelving assembly having at least three spaced poles, each having a connector, a first post unit and a second post unit. Each post unit has first and second opposing ends, with a first protrusion extending radially inwardly from the hollow interior surface of the first post unit adjacent the first end thereof, and a second protrusion extending radially inwardly from the hollow interior surface of the second post unit adjacent the second end thereof. Each connector has first and second opposing ends, a first track provided adjacent the first end of the connector and a second track provided adjacent the second end of the connector. Each of the first and second tracks has a leg portion extending from one of the first or second end of the connector, and a foot extending from the leg portion. The first protrusion of each first post unit is retained in the foot of the first track of each connector, and the second protrusion of each second post unit is retained in the foot of the second track of each connector, when the first and second post units are connected to a connector.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices, components, mechanisms and methods are omitted so as to not obscure the description of the present invention with unnecessary detail.

The present invention provides a connector that is used to connect two separate post units. The connector of the present invention provides a plurality of connecting tracks that allow the separate post units to be accurately and securely connected thereto to effectuate a simple yet stable connection.

Figure 1:
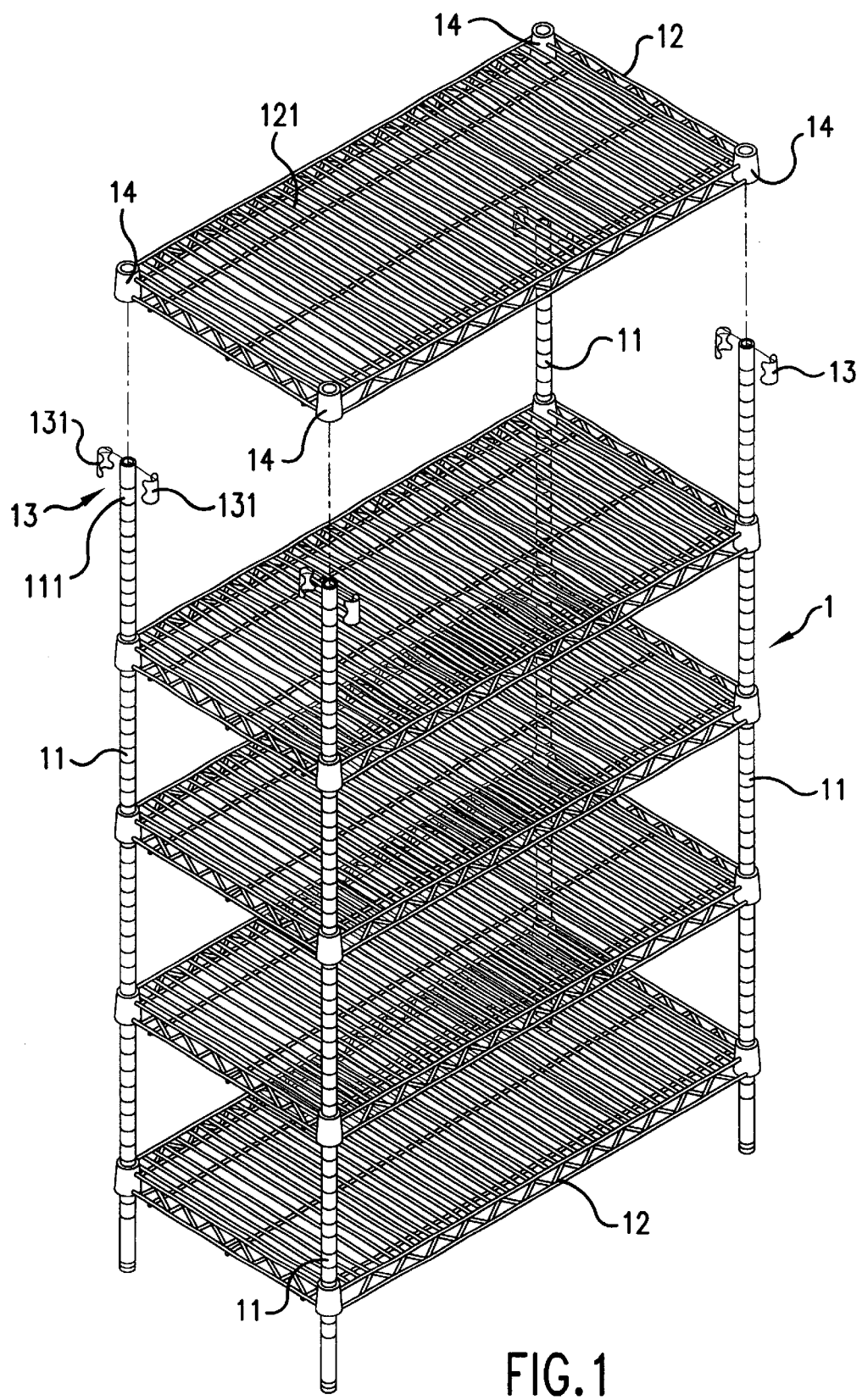
FIG. 1 is an exploded perspective view of a conventional adjustable shelving assembly.
Figure 2:
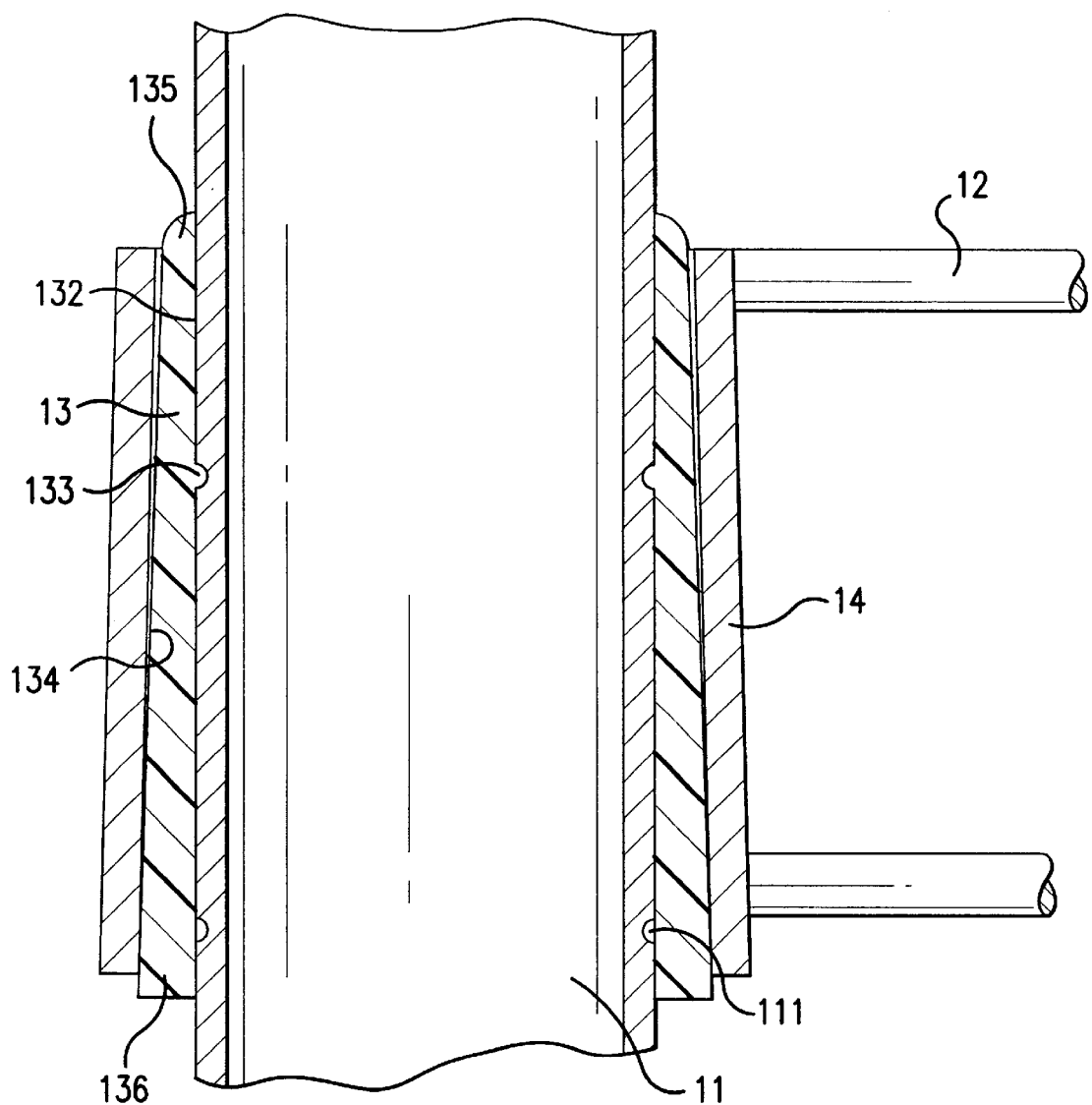
FIG. 2 is a cross-sectional view of the assembly of FIG. 1.
Figure 3:
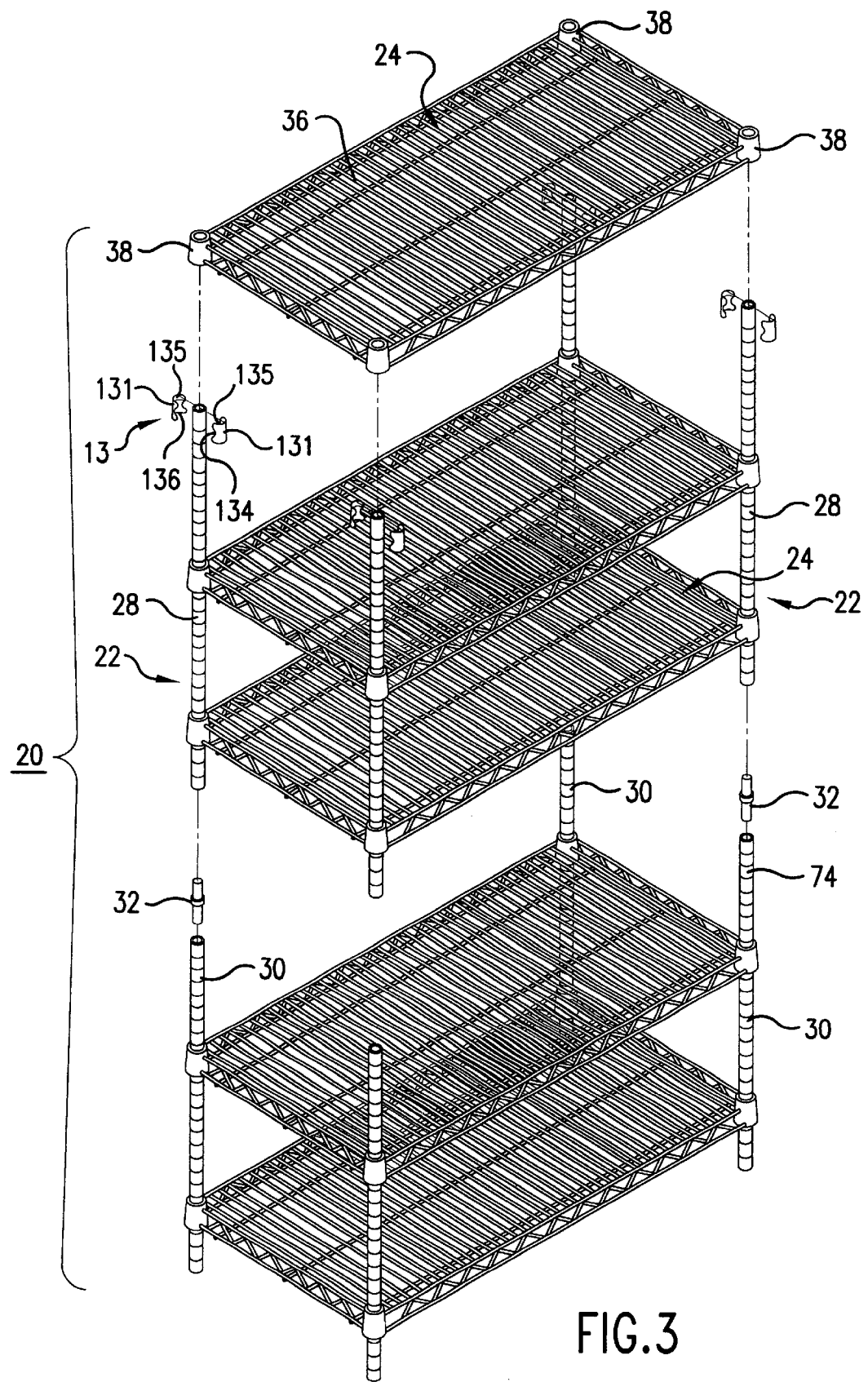
FIG. 3 is an exploded perspective view of an adjustable shelving assembly according to one embodiment of the present invention.

FIG. 3 illustrates the adjustable shelving assembly according to one embodiment of the present invention. The assembly 20 has four spaced-apart poles 22, a plurality of trays 24 hanging among the four poles 22, and a plurality of sets of four tubular sleeves 13a. Each pole 22 is comprised of at least two separate post units, such as a first post 28 and a second post 30 shown in FIGS. 3 and 4, which when coupled together by a connector 32, forms an elongated rod. Each post 28 and 30 is provided with a plurality of equally spaced annular peripheral grooves 74. Each tubular sleeve 13a has the same construction as the tubular sleeves 13 illustrated in connection with FIGS. 1 and 2, and the curved pieces 131a have the same construction as the curved pieces 131 illustrated in connection with FIGS. 1 and 2, and shall not be described in greater detail herein. The tray 24 includes a tray body 36 which has four positioning tubes 38, one provided at each of the four corners of the tray body 36. Each positioning tube 38 also has an inner diameter larger than the narrow top end 135 of the tubular sleeves 13a but smaller than the wide bottom end 136 of the tubular sleeves 13a.

Referring now to FIGS. 4–7, the connector 32 is an elongated generally cylindrical tube that has two sets of tracks 44 and 46 separated by a flange 48. Each set of tracks 44, 46 is illustrated in the embodiment of FIGS. 4–7 as having three tracks spaced apart in an annular manner about the outer surface 49 of the connector 32, although each set of tracks 44, 46 can have any number of tracks per set (including one per set). However, for achieving modularity, each set of tracks 44, 46 for a given embodiment preferably has the same number of tracks. In addition, each track 44, 46 may be identical in shape and size to provide the desired modularity. Each track 44 and 46 can be cut from the material of the connector 32 so that each track 44 and 46 is recessed from the outer surface 49 of the connector 32, or the boundaries of the tracks 44 and 46 can be defined by ridges extending axially from the outer surface 49.

Figure 10:
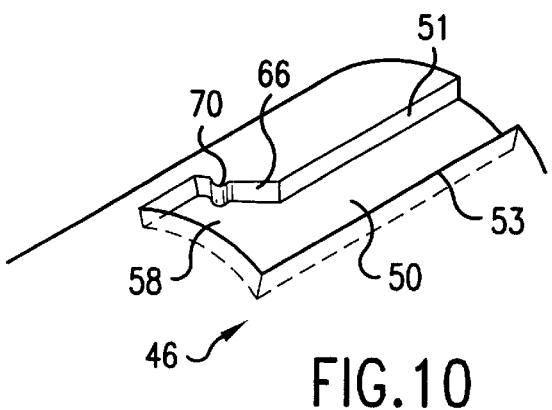
FIG. 10 is a sectional view of a portion of a track of the connector of FIG. 4.

Each track 44 and 46 is elongated in nature and has a generally vertical leg portion 50 and 52, respectively, extending from a separate opposing end 54 and 56, respectively, of the connector 32, towards the flange 48. The leg portions 50 and 52 have widened openings 55 and 57, respectively, at the ends 54 and 56, respectively. Each leg portion 50, 52 has generally parallel vertical edges 51 and 53. The leg portions 50, 52 terminate a short distance from the flange 48 by extending sideways or laterally into respective deflections or feet 58 and 60, respectively. Each foot 58 and 60 is identical, so only one foot 58 will be described in greater detail. The foot 58 is defined by an inner edge 62 that is generally parallel to the flange 48 and which is coupled to the longer vertical edge 53 of the leg portion 50, a vertical edge 64 extending from the inner edge 62, and an angled edge 66 that couples the shorter vertical edge 51 of the leg portion 50 to the vertical edge 64. As explained in greater detail below, the angled edge 66 provides a guided angled path for guiding a dimple 68 of the first post 28 from the leg portion 50 into the foot 58. A bump or protrusion 70 is provided along the angled edge 66 and extends inwardly into the foot 58 to provide for a "click" feel, and to lock the dimple 68 inside the confines of the foot 58 when the first post 28 is securely connected to the connector 32. It is possible to provide one bump 70 for each track 44, 46, or one bump 70 for only one track 44 or 46 in a set of the tracks, or for as many tracks 44, 46, within each set of tracks 44, 46 as desired. In addition, in one possible embodiment of the present invention illustrated in FIG. 10, the depth of each track 44, 46 gradually decreases from the region of the leg portion 50, 52 to the vertical edge 64 inside the feet 58, 60 so that the depth of the track 44, 46 is smallest adjacent the vertical edge 64. The decreased depth of the feet 58, 60 causes the dimple 68 to press harder against the body of the connector 32 (i.e., at the region of the feet 58, 60) so to ensure a tight and secure fit when the first and second posts 28, 30 are securely connected to the connector 32.

Figures 4, 5:
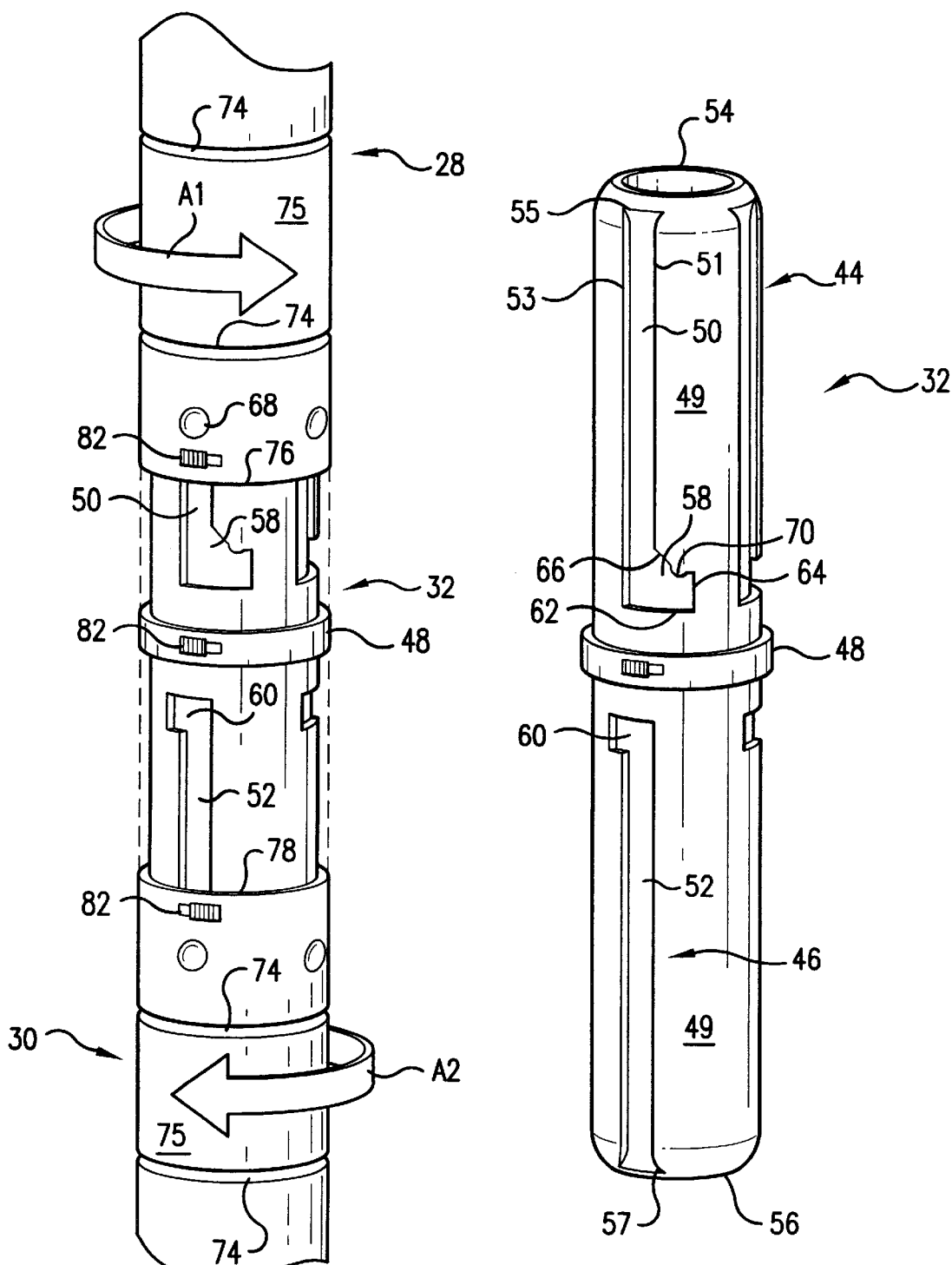
FIG. 4 is a perspective sectional view of the connector and post units according to one embodiment of the present invention.
FIG. 5 is a perspective view of the connector of FIG. 4.
Figure 6:
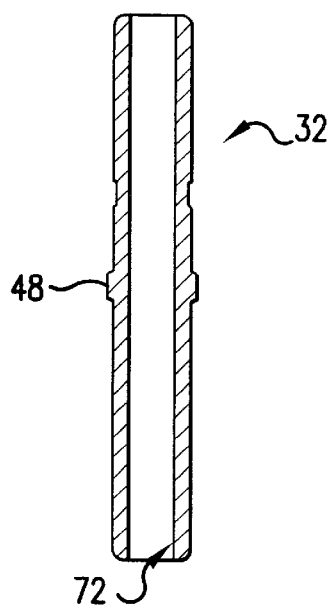
FIG. 6 is a cross-sectional view of the connector of FIG. 4.
Figure 7:
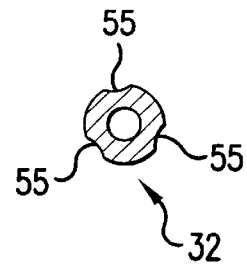
FIG. 7 is a top plan view of the connector of FIG. 4.

In one embodiment, the feet 58 of one set of tracks 44 extend laterally in a direction opposite to the direction which the feet 60 of the other set of tracks 46 extend (see FIGS. 4 and 5). This opposite orientation of the feet 58, 60 is provided to facilitate opposing twisting motion by a user when assembling the first and second posts 28, 30 at one connector 32, since a user holding one post 28 in one hand and the other post 30 in the other hand will find it more convenient to twist the two posts 28, 30 in opposite directions.

The connector 32 is preferably made from a material that will not wear out as easily after repeatedly sliding of the dimple 68 along the leg portions 50, 52 and the feet 58, 60. For example, if a metal is used for the connector 32, then the metal dimple 68 will slide along the metal tracks 44, 46 and cause the tracks 44, 46, and in particular, the bumps 70, to be worn quickly. Therefore, softer yet sturdy materials such as nylon, glass-filled nylon, and structural foam, among others, can be used for the connector 32. If these materials are used, then the tracks 44, 46 can be formed by injection molding. In addition, as shown in greater detail in FIG. 6, the connector 32 has a generally hollow interior that can be supported by a steel tube 72 to provide rigidity to the connector 32.

Figure 8:
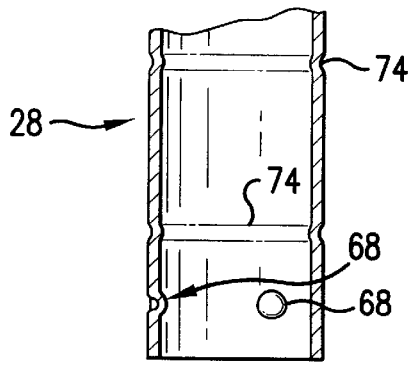
FIG. 8 is a perspective sectional view of a pole unit according to one embodiment of the present invention.
Figure 9:
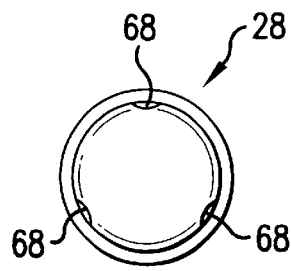
FIG. 9 is a top plan view of the pole unit of FIG. 8.

Referring now to FIGS. 4 and 8–9, each of the posts 28, 30 can be identical in configuration and size, even though different numeral designations are being used herein to more conveniently and clearly describe the two separate posts 28, 30 and how they interact with the connector 32. Each post 28, 30 can be formed from a generally cylindrical metal tube and has annular grooves 74 spaced apart along its length. Each opposing end (see 76 for post 28 and 78 for post 30) of each post 28, 30 has one or more protrusions or dimples 68 extending radially into the interior of the hollow posts 28, 30. The protrusions or dimples 68 can be made by stamping, and are preferably positioned at a distance from the ends 76 and 78 that is about the same as the distance between the flange 48 and the center of each foot 58 and 60. Since the posts 28, 30 are identical, FIGS. 8 and 9 illustrate a portion of the first post 28 only. The number of dimples 68 should correspond to the number of tracks 44 or 46 for the connector 32.

The assembly of the first and second posts 28, 30 at a connector 32 will be illustrated in connection with FIGS. 4 and 5. First, the user inserts one end 54 of the connector 32 into the hollow interior of the first post 28 through its bottom end 76, and aligns the dimple(s) 68 into the widened opening(s) 55 of each track 44. The user then inserts the other end 56 of the connector 32 into the hollow interior of the second post 30 through its bottom end 78, and aligns the dimple(s) 68 into the widened opening(s) 57 of each track 46. With the dimples 68 fitted into the leg portions 50, 52 of the tracks 44, 46, the user can press both posts 28, 30 towards each other and the flange 48. This pressing action will force the dimples 68 to slide along the leg portions 50, 52. When the dimples 68 approach the feet 58, 60, the ends 76 and 78 should be near or adjacent the flange 48. The user then turns the posts 28 and 30 in the opposing directions indicated by the arrows A1 and A2, respectively, causing the dimples 68 to enter the feet 58, 60. The angled edge 66 guides each corresponding dimple 68 into the foot 58 and past the bump 70 to be seated in the foot 58 between the bump 70 and the vertical edge 64.

When the connection has been effectuated, the flange 48 is preferably flush with the exterior surface 75 of the posts 28, 30. Lock icons 82 can be provided on the exterior surface 75 of the posts 28, 30 and the flange 48 to allow the user to confirm that the connection has been completed. For example, the icons 82 on the flange 48, and on the posts 28, 30, can be positioned so that the icons 82 on the flange 48 and posts 28, 30 are aligned when the dimples 68 are seated inside the feet 58, 60.

The user can then continue to use additional connectors 32 and posts 28, 30 to create a pole 22 having any desired height. Although FIG. 3 illustrates each pole 22 as having two separate posts 28 and 30, any number of posts such as 28 and 30 can be provided to form a given pole 22 of any desired length. In this regard, it is preferable that the length of each post 28, 30 does not exceed the widest dimension of the trays 24, so as to facilitate convenient package and storage. A total of three or four poles 22 can be created in the same manner to provide sufficient support for the trays 24. The user then selects the grooves 74 on the poles 22 that will define the desired heights of the various shelving trays 24, and installs tubular sleeves 13a at these grooves 74 according to the technique described in connection with FIGS. 1 and 2 above. Each tray 24 can then be supported on each set of four tubular sleeves 13a in the manner described in connection with FIGS. 1 and 2 above.

To adjust the height of a tray 24, the tray 12 is moved upwardly to disengage the positioning tubes 38 from the tubular sleeves 13a, and the tubular sleeves 13a can then be positioned at another height along the poles 22 before the tray 24 is again fixed to the four tubular sleeves 13a.

The tracks 44, 46 and dimple 68 combination of the present invention provide a convenient, stable and effective mechanism for connecting separate pole pieces. First, the tracks 44, 46 provide a widened opening 55 or 57 that allows the dimples 68 to be easily fitted into the leg portions 50, 52. Once inside the tracks 44, 46, the dimples 68 can slide easily and quickly along the leg portion 50, 52 and into the feet 58, 60 to effectuate the connection. The construction and configuration of the tracks 44, 46, and in particular, the feet 58, 60, further ensure a secure and effective connection that minimizes movement in two directions. For example, the decreasing depth of the feet 58, 60 causes the dimple 68 to press harder against the body of the connector 32 (i.e., at the region of the feet 58, 60) so to ensure a tighter and more secure friction-type fit that minimizes side-to-side or lateral movement. In addition, the dimple 68 sliding along the angled edge 66 will provide a force that pushes the corresponding pole 28 or 30 towards the flange 48, thereby helping the user to more effectively and securely complete the connection.

In addition, the connectors 32 are positioned in the poles 22 in a manner where the distance between adjacent grooves 74 can be consistent. For example, the distance between a groove 74 and the end 76 of the post 28 can be about half the distance between adjacent grooves 74 on the same post 28, and the distance between a groove 74 and the end 78 of the post 30 can be about half the distance between adjacent grooves 74 on the same post 30. Thus, the positioning of the connector 32 and the ends 76, 78 of the posts 28, 30 will not impact the spacing between adjacent grooves 74 on any of the posts 28, 30.

Those skilled in the art will appreciate that the embodiments and alternatives described above are non-limiting examples only, and that certain modifications can be made without departing from the spirit and scope thereof. The accompanying claims are intended to cover such modifications as would fall within the true scope and spirit of the present invention.

What is claimed is:

1. A modular shelving assembly, comprising:

at least three spaced poles, each having a connector, a first post unit and a second post unit, each post unit having first and second opposing ends, and a hollow interior that defines an interior surface, with a first protrusion extending radially inwardly from the interior surface of the first post unit adjacent the first end thereof, and a second protrusion extending radially inwardly from the interior surface of the second post unit adjacent the second end thereof;

each connector having first and second opposing ends, a first track provided adjacent the first end of the connector and a second track provided adjacent the second end of the connector, each of the first and second tracks having a leg portion extending from one of the first or second end of the connector, and a foot extending from the leg portion;

wherein each leg portion has a first thickness, and one of the feet has a second thickness that is less than the first thickness of its corresponding leg portion; and wherein the first protrusion of each first post unit is retained in the foot of the first track of the corresponding connector, and the second protrusion of each second post unit is retained in the foot of the second track of the corresponding connector, when the first and second post units are connected to the corresponding connector.

2. The assembly of claim 1, wherein the second thickness in the foot gradually decreases from the first thickness to a smaller thickness as the foot extends away from the corresponding leg portion.

3. The assembly of claim 1, wherein one foot includes an angled edge that extends downwardly and laterally from the corresponding leg portion.

4. The assembly of claim 3, wherein the angled edge of one foot has an inwardly-extending bump.

5. The assembly of claim 1, wherein each leg portion has a widened opening adjacent the corresponding first or second end of the connector.

6. The assembly of claim 1, wherein each connector further includes a flange provided between the first and second track.

7. The assembly of claim 1, wherein the first track includes a plurality of spaced-apart tracks, and the second track includes a plurality of spaced-apart tracks.

8. The assembly of claim 1, wherein the foot of the first track is orientation in a direction that is opposite to the direction of the foot of the second track.

9. The assembly of claim 6, wherein each post unit also includes an outer surface, and further including icons provided on the outer surface of each post unit and the flange.

10. The assembly of claim 1, wherein each connector has a hollow connector body that is supported by a metal tube.

11. A modular shelving assembly, comprising:

at least three spaced poles, each having a connector, a first post unit and a second post unit, each post unit having first and second opposing ends, and a hollow interior that defines an interior surface, with a first protrusion extending radially inwardly from the interior surface of the first post unit adjacent the first end thereof, and a second protrusion extending radially inwardly from the interior surface of the second post unit adjacent the second end thereof, each post unit also having an outer surface;

each connector having first and second opposing ends, a first track provided adjacent the first end of the connector and a second track provided adjacent the second end of the connector, each of the first and second tracks having a leg portion extending from one of the first or second end of the connector, and a foot extending from the leg portion, each connector further including a flange provided between the first and second track;

icons provided on the outer surface of each post unit and the flange;

wherein the first protrusion of each first post unit is retained in the foot of the first track of the corresponding connector, and the second protrusion of each second post unit is retained in the foot of the second track of the corresponding connector, when the first and second post units are connected to the corresponding connector; and wherein each leg portion has a first thickness, and one of the feet has a second thickness that is less than the first thickness of its corresponding leg portion.

12. The assembly of claim 11, wherein each foot includes an angled edge that extends downwardly and laterally from the corresponding leg portion.

\* \* \* \* \*